United States Patent
Hou et al.

(10) Patent No.: US 10,416,338 B2
(45) Date of Patent: Sep. 17, 2019

(54) METHOD FOR MINIMIZATION OF BOREHOLE EFFECTS FOR MULTICOMPONENT INDUCTION TOOL

(71) Applicant: Halliburton Energy Services, Inc., Houston, TX (US)

(72) Inventors: Junsheng Hou, Kingwood, TX (US); John Andrew Quirein, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 20 days.

(21) Appl. No.: 15/544,838

(22) PCT Filed: Feb. 19, 2015

(86) PCT No.: PCT/US2015/016563
§ 371 (c)(1),
(2) Date: Jul. 19, 2017

(87) PCT Pub. No.: WO2016/133517
PCT Pub. Date: Aug. 25, 2016

(65) Prior Publication Data
US 2017/0363765 A1 Dec. 21, 2017

(51) Int. Cl.
*G01V 3/28* (2006.01)
*E21B 47/022* (2012.01)
(Continued)

(52) U.S. Cl.
CPC .......... *G01V 3/28* (2013.01); *E21B 47/02216* (2013.01); *E21B 47/0905* (2013.01);
(Continued)

(58) Field of Classification Search
CPC ....................................................... G01V 3/28
(Continued)

(56) References Cited

U.S. PATENT DOCUMENTS

| 6,044,325 | A | 3/2000 | Chakravarthy et al. |
| 6,381,542 | B1 | 4/2002 | Zhang et al. |

(Continued)

FOREIGN PATENT DOCUMENTS

WO 2014143015 A1 9/2015

OTHER PUBLICATIONS

Barber, T. et al., 2004, "Determining formation resistivity anisotropy in the presence of invasion," SPE 80th Annual Technical Conference and Exhibition.
(Continued)

*Primary Examiner* — Hien D Khuu
(74) *Attorney, Agent, or Firm* — Chamberlain Hrdlicka

(57) ABSTRACT

A method to minimize borehole effects upon a multi-component induction tool within a well and borehole with water-based mud includes measuring parameters of the reservoir with the induction tool to create an array of measured components. The method further includes comparing a measured component from the array of measured components with a corresponding model component from an array of model components for a reservoir model with known parameters and no borehole effects, and determining the parameters for the reservoir based upon the comparison of the measured component and the corresponding model component.

20 Claims, 13 Drawing Sheets

(51) Int. Cl.
*E21B 47/09* (2012.01)
*E21B 49/00* (2006.01)
*G01V 3/38* (2006.01)
*G01V 99/00* (2009.01)
*E21B 47/16* (2006.01)

(52) U.S. Cl.
CPC ............... *E21B 49/00* (2013.01); *G01V 3/38* (2013.01); *G01V 99/005* (2013.01); *E21B 47/16* (2013.01)

(58) Field of Classification Search
USPC .......................................................... 702/7
See application file for complete search history.

(56) References Cited

U.S. PATENT DOCUMENTS

| | | | |
|---|---|---|---|
| 6,819,112 B2 | 11/2004 | Gianzero et al. | |
| 2005/0256642 A1 | 11/2005 | Barber et al. | |
| 2007/0208546 A1 | 9/2007 | Fang et al. | |
| 2012/0119744 A1* | 5/2012 | Habashy | G01V 3/20 324/339 |
| 2013/0073206 A1* | 3/2013 | Hou | G01V 3/28 702/7 |
| 2016/0124108 A1* | 5/2016 | Wu | G01V 3/38 702/7 |

OTHER PUBLICATIONS

Hou, J. et al., 2012, "Realtime borehole correction for a new multicomponent array induction logging tool in OBM wells," Presented at the SPWLA 53rd Annual Logging Symposium, Jun. 16-20, Cartagena, Colombia.

Hou, J. et al., 2013a, "Real time borehole correction of multicomponent induction data acquired in OBM wells algorithm and applications," Petrophysics, 54(2), 128-141.

Hou, J. et al., 2013b, "A new multi-frequency triaxial array induction tool for enhancing evaluation of anisotropic formations and field testing," Presented at SPWLA 54th Annual Meeting, Jun. 22-26, New Orleans, Louisiana, USA.

Kunz, K. et al., 1958, "Some effects of formation anisotropy on resistivity measurements in borehole," Geophysics, 23, 770-794.

Moran, J.H. et al., 1979, "Effects of formation anisotropy on resistivity-logging measurements," Geophysics, 44, 1266-1286.

Quirein, J. et al., 2012, "Evaluation of general resistivity density-based saturation in thin, laminated sand-shale sequences," Presented at the AAPG International Conference & Exhibition, Sep. 16-19, Singapore.

Rabinovich, M. et al., 2005, "Processing multicomponent induction data for formation dip and azimuth in anisotropic formations," SPWLA 46th Annual Logging Symposium.

International Search Report and Written Opinion issued in corresponding application No. PCT/US2015/016563 dated Oct. 20, 2015, 16 pgs.

* cited by examiner

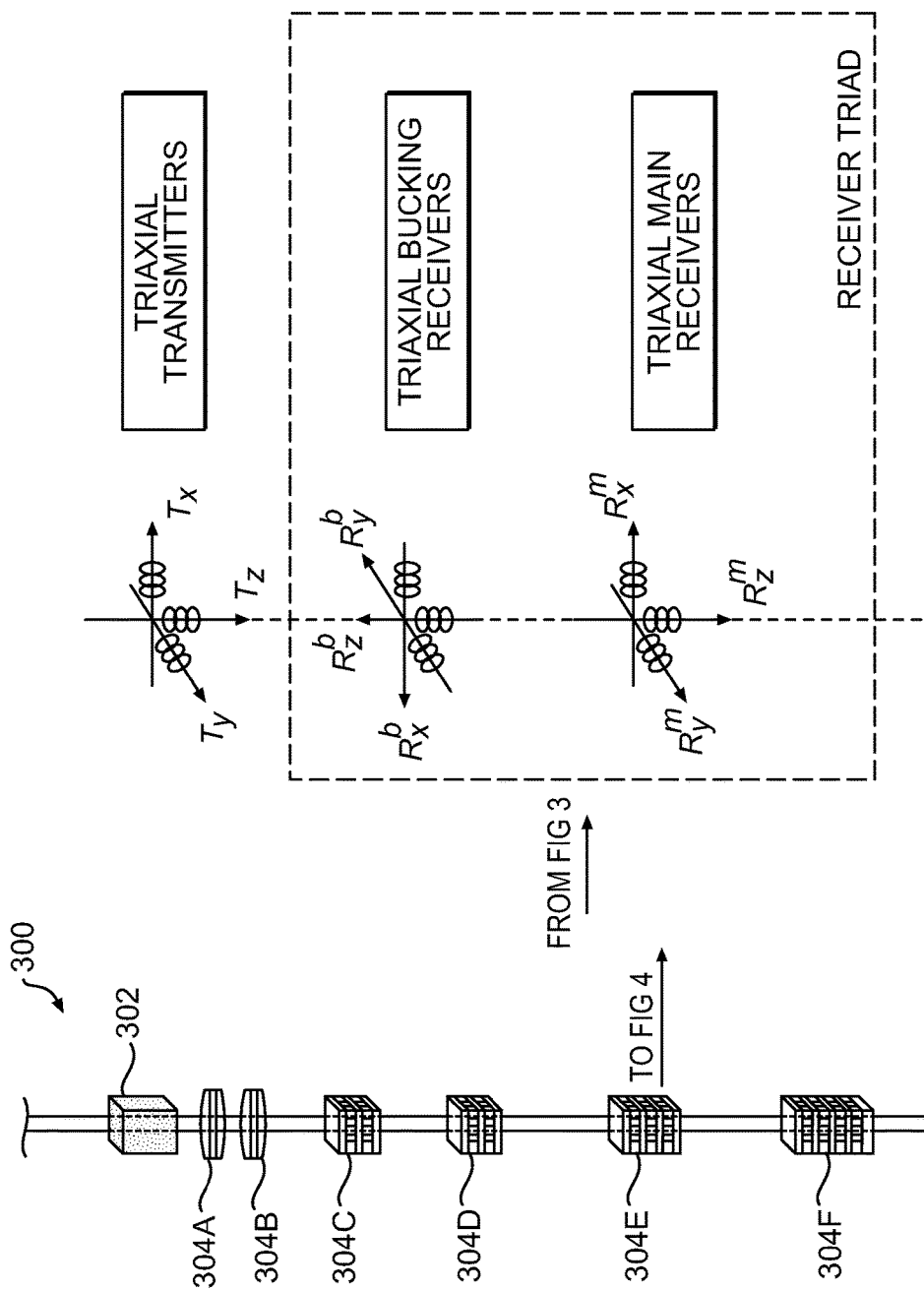

METHOD FOR MINIMIZATION OF BOREHOLE EFFECTS FOR MULTICOMPONENT INDUCTION TOOL

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Induction tools are used in the oil and gas industry to determine the resistivity of earth formations and reservoirs surrounding a borehole. Induction tools work by using a transmitting coil (transmitter) to set up an alternating magnetic field in the earth formations. This alternating magnetic field induces eddy currents in the formations. One or more receiving coils (receivers), positioned at a distance from the transmitter, are used to detect the current flowing in the earth formation. The magnitudes of the received signals are proportional to the formation conductivity. Therefore, formation conductivities may be derived from the received signals.

However, heterogeneities in the formation complicate the derivation of formation conductivity from the received signals. One prevalent complication that affects the derivation of formation conductivity from the received signals arises from the presence of conductive fluids in the borehole surrounding the induction instrument. This is referred to generally as the borehole effects. Often, the fluids in the borehole (drilling mud) are made very saline, thus conductive, as part of the drilling practice. The conductive drilling muds can contribute a significant proportion of the received signals and, therefore, should be carefully removed, minimized, or corrected.

The borehole effects upon the measurements of an induction tool may be further magnified when used within a borehole of a well containing water-based mud (WBM), as opposed to oil-based mud (OBM). Oil-based mud may have a high resistivity compared to that of water-based mud. For example, oil-based mud may have a resistivity of about 1,000 ohm-meter, or even higher values, whereas water-based mud may have a resistivity as low as about 0.1 ohm-meter, or even lower values. The high resistivity for the oil-based mud has only a small borehole effect on the measurements of the induction tool as the fluids within the borehole have high resistivity compared to the water-based mud. On the other hand, the low resistivity of the water-based mud increases the borehole effects upon the measurements of the induction tool. Accordingly, there continues to be a need to improve the reliability of the measurement of induction tools, particularly when used within wells containing water-based mud.

BRIEF DESCRIPTION OF THE DRAWINGS

Illustrative embodiments of the present disclosure are described in detail below with reference to the attached drawing figures, which are incorporated by reference herein and wherein:

FIG. 3 shows an illustrative configuration for a multi-component induction logging tool in accordance with one or more embodiments of the present disclosure;

FIG. 4 shows an illustrative tool model suitable for defining a measured resistivity or conductivity tensor in accordance with one or more embodiments of the present disclosure;

Figure 1:
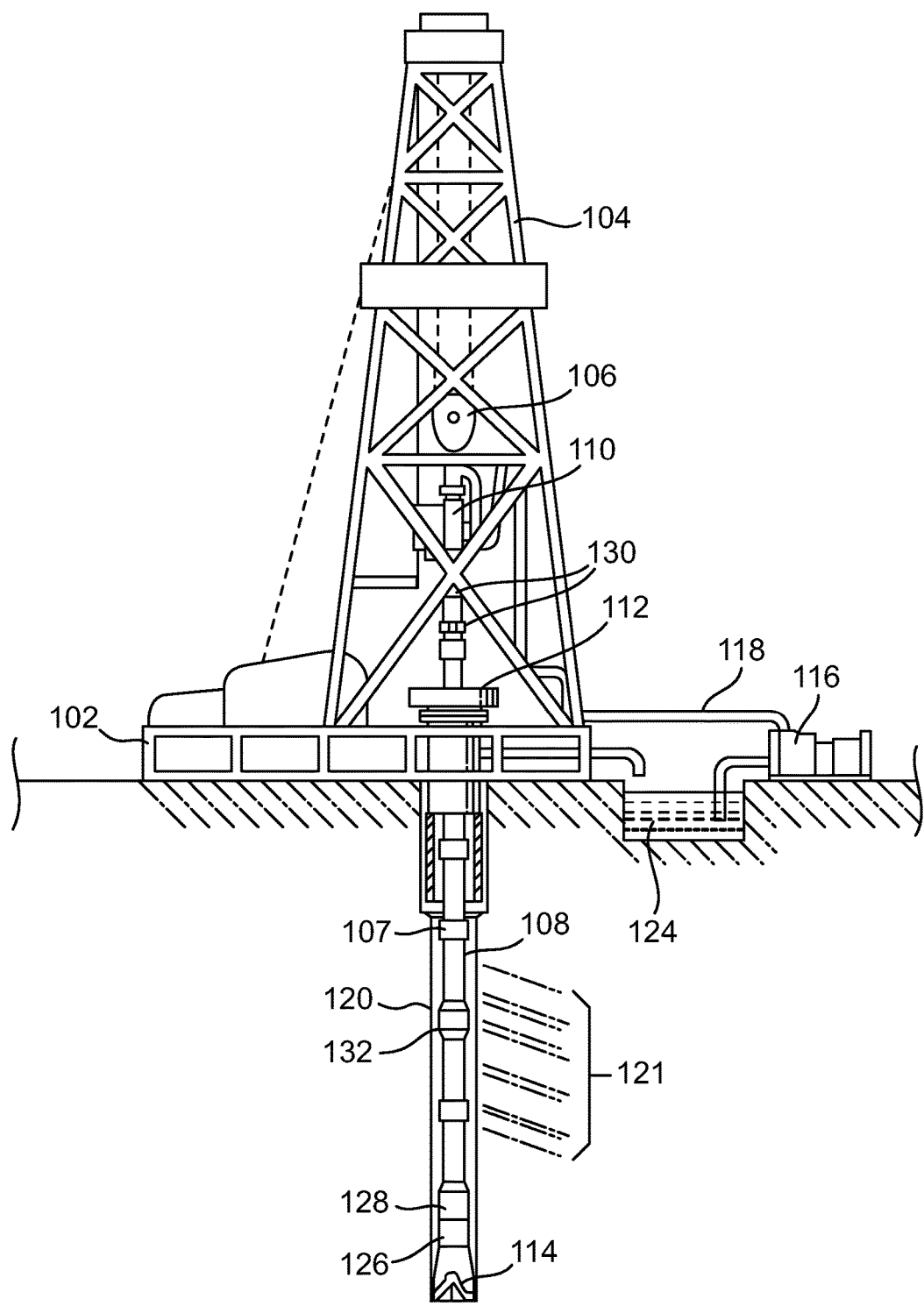
FIG. 1 shows an illustrative logging while drilling environment including dipping formation beds in accordance with one or more embodiments of the present disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be full recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Accordingly various tools, systems, and methods are disclosed to correct or minimize the borehole effects of an induction tool within a well that includes water-based mud. One or more of the embodiments include a tool or a tool component and at least one processor. The tool may be positioned within a borehole extending into a well to measure parameters of a reservoir. The tool provides transmitter-receiver coupling measurements, such as resistivity or conductivity measurements, that may include an array of components along the longitudinal tool axis (RZZ), along the perpendicular axis (RXX or RYY), and/or along the longitudinal and perpendicular axes (RXY, RXZ, RYX, RYZ, RZX, or RZY).

One or some of the measured components, or combinations of the measured components (e.g., A·RXX+B·RZZ, C·RXX+D·RYY, E·RXZ+F·RZX), may then be compared with corresponding components or combinations of components of a reservoir model that has known parameters and no borehole effects. For example, a multi-inversion of a reservoir model with known parameters and no borehole effects may be performed to determine an array of components for the reservoir model for the comparison. As the borehole effects may have a stronger influence over some components and combinations of components over others, the comparison and selection of the components and/or combinations of components with less or no influence by borehole effects may enable the parameters (e.g., horizontal formation resistivity (Rh), vertical formation resistivity (Rv), formation dip, and formation azimuth) of the reservoir and/or the borehole effects to be determined.

Turning now to the present figures, FIG. 1 shows an illustrative logging while drilling (LWD) environment. A drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As bit 114 rotates, a borehole 120 is created that passes through various formations 121 within a reservoir. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

In wells employing acoustic telemetry for MD, downhole sensors (including resistivity logging or induction tool 126) are coupled to a telemetry module 128 having a transmitter (e.g., acoustic telemetry transmitter) that transmits signals in the form of acoustic vibrations in the tubing wall of drill string 108. A receiver array 130 may be coupled to tubing below the top drive 110 to receive transmitted signals. One or more repeater modules 132 may be optionally provided along the drill string to receive and retransmit the telemetry signals. Of course other telemetry techniques can be employed including mud pulse telemetry, electromagnetic telemetry, and wired drill pipe telemetry. Many telemetry techniques also offer the ability to transfer commands from the surface to the tool, thereby enabling adjustment of the tool's configuration and operating parameters. In some embodiments, the telemetry module 128 also or alternatively stores measurements for later retrieval when the tool returns to the surface.

The tool 126 in this embodiment may be integrated into the bottom-hole assembly near the bit 114. The logging or induction tool 126 may take the form of a drill collar, i.e., a thick-walled tubular that provides weight and rigidity to aid the drilling process. As the bit extends the borehole through the formations, the tool 126 collects multi-component induction measurements, as well as measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the tool includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, various resistivity logging tools disclosed herein can be used to steer the bit to the desirable bed.

Figure 2:
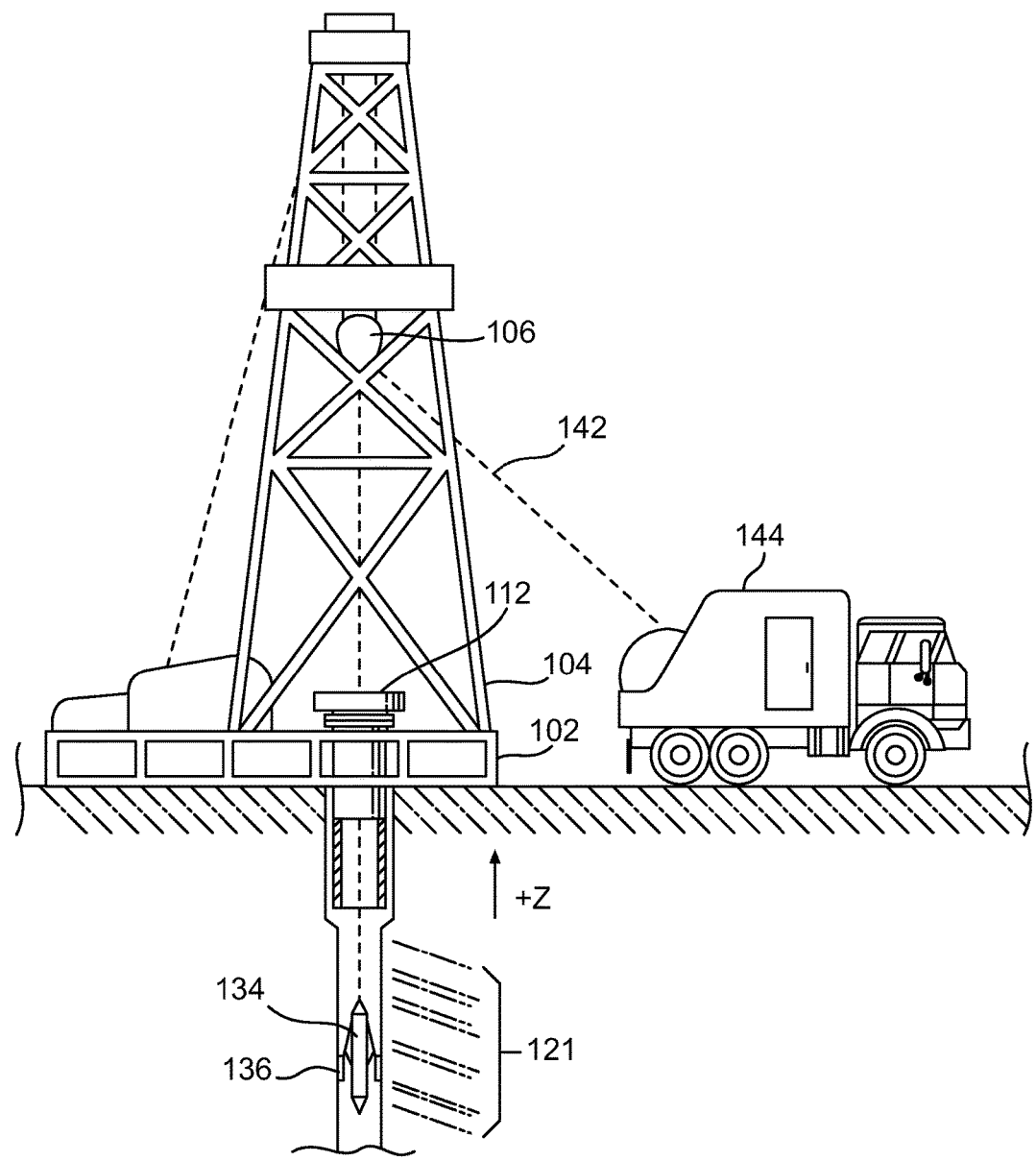
FIG. 2 shows an illustrative wireline logging environment including dipping formation beds in accordance with one or more embodiments of the present disclosure.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity logging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool.

FIG. 3 shows an example of a multi-component induction tool 300 that may be used in accordance with one or more embodiments of the present disclosure. The tool 300 includes a transmitter 302 and one or more receivers 304, such as six receivers 304A-304F as shown here. In this embodiment, the transmitter 302 may be a transmitter triad (collocated triaxial array of three coils), the two receivers 304A and 304B closest to the transmitter may be axial receiver induction coils, and the receivers 304C-304F may be triads as well. The receivers 304A-304F are known distances from the transmitter 302. For example, the receiver 304A may be about 6 in (15 cm) from the transmitter 302, the receiver 304E may be about 10 in (25 cm) from the transmitter 302, the receiver 304C may be about 17 in (43 cm) from the transmitter 302, the receiver 304D may be about 29 in (74 cm) from the transmitter 302, the receiver 304E may be about 50 in (127 cm) from the transmitter 302, and the receiver 304F may be about 80 in (203 cm) from the transmitter 302.

The tool 300 may operate by sequentially energizing each of the coils (X, Y, and A-directions) in the transmitter 302 and measuring the signals in each of the receivers 304A-304F. Hence, each of the receivers 304C-304F may produce nine signals per frequency (e.g., an array of nine-components). These signals may also be sent at different frequencies, such as by using three or four different frequencies. These signals and some components are then selected to minimize borehole effects and inverted to obtain the desired formation parameters, including horizontal and vertical resistivity, Rh, Rv, relative (formation to borehole) dip and azimuth. As mentioned above, the tool 300 may include Or use a directional package so that true formation dip and azimuth can be determined, and the tool 300 may also include a caliper (e.g., a six-arm caliper) to find the relative position of the tool 300 in the borehole.

The tool 300 may operate in boreholes filled with air, oil-based muds, and/or water-based muds in this embodiment. A receiver triad, such as receiver 304E, may include an arrangement of six coils: three main coils and three bucking coils, with each coil paired in one of the orthogonal directions X, Y, Z, as represented diagrammatically with an equivalent dipole model in FIG. 4. Both the main and bucking coils are collocated, and the bucking coils are wound as to minimize the direct coupling signals. In one embodiment, the transmitter triad may have three collocated coils. The orthogonal coupling component measurements correspond to the tool model shown in FIG. 4. A triad of transmitters Tx, Ty, Tz, represent magnetic dipole antennas oriented parallel to the tool's x, y, and z axes respectively. A triad of main receivers Rxm, Rym, Rzm similarly represent magnetic dipole antennas oriented along these axes, as do a triad of bucking receivers Rxb, Ryb, Rzb. The signal measurements of the bucking receiver triad can be subtracted from the main receiver triad to eliminate the direct signal from the transmitter and increase sensitivity to formation properties.

Each triad may send, such as up hole, a nine-component complex measurement or tensor for each frequency. The tool 300 may energize the formation or reservoir with multiple frequencies, such as four frequencies, simultaneously. The information from the receiver triads 304-C-304F, plus the information from the closer receivers 304A and 304B, is converted into a digital string that is sent uphole via the telemetry system. The information may contain voltages, in which the voltages may be calibrated into a conductivity measurement (mmh/m) or a corresponding resistivity measurement (ohm-m). The measurements may be compensated for temperature changes in the sonde error, electronics drifts, and changes in gain. The measurements may also be processed to accommodate for the tool position in the borehole and removes any effects from tool position and borehole effects. In one embodiment, a first I-D radial inversion algorithm may be used, and as a result of this inversion, a first quick look of the results (Rh, Rv, dip, and azimuth) can be delivered in real time, and all of the borehole effects corrected/minimized tensors can be presented. The borehole effects corrected/minimized tensors may then be input (post real time) to a 1-D vertical inversion algorithm. This algorithm optionally squares or not the log, and the results give answers that have reduced shoulder bed effects.

In the antenna configuration of FIG. 4, if each transmitter is fired in turn, and signal measurements are made at each receiver in response to each firing, nine-component measurements (Rm–Rb) are obtained. These nine-component measurements enable the determination of a complete coupling matrix C. (CIJ=aIJVIJ, where I is the index for receiver axis x, y, z, and J is the index for transmitter axis x, y, z, all is a constant determined by the tool design, and VII is a complex value representing the signal amplitude and phase shift measured by receiver I in response to the firing of transmitter J.) Given a coupling matrix for any given orientation of the tool, the system can apply simple rotational transformations to determine a corresponding matrix for any arbitrary tool orientation.

Figure 5:
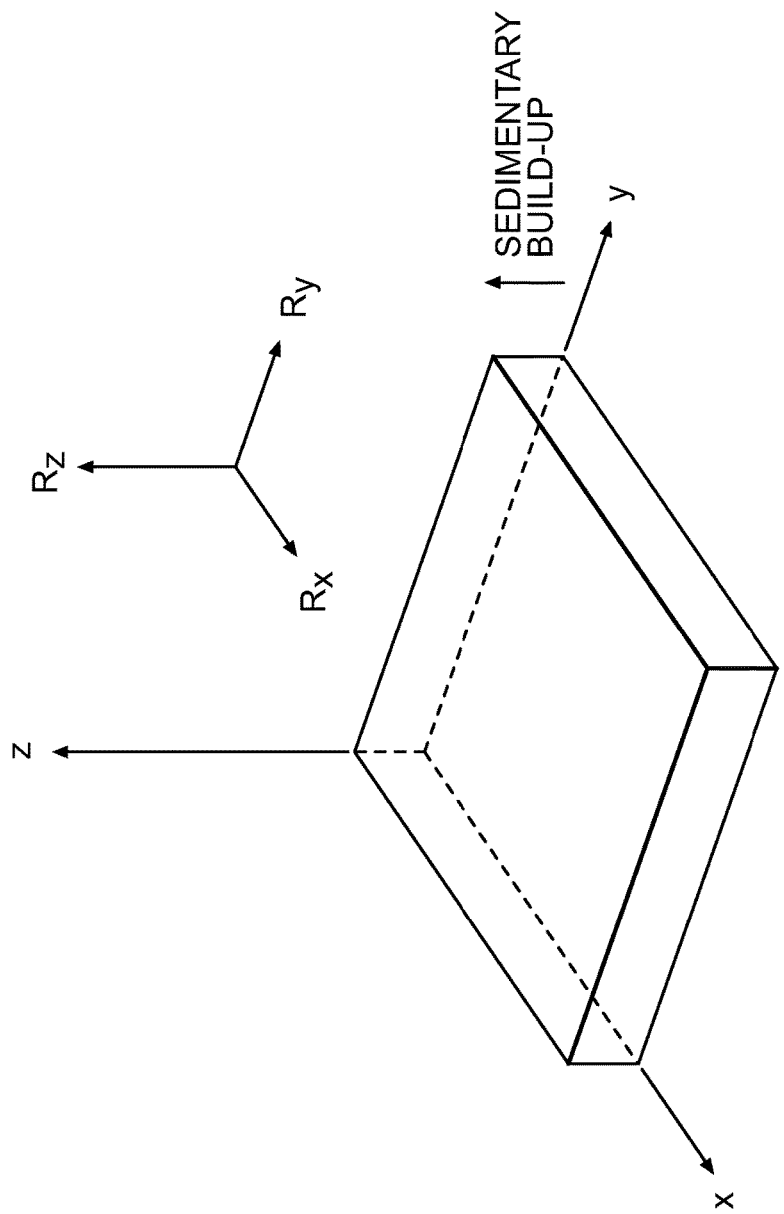
FIG. 5 is a schematic perspective view of a Cartesian coordinate system in a sedimentary earth formation in accordance with one or more embodiments of the present disclosure.

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 5. FIG. 5 shows a portion of a sedimentary formation bed, with the z-axis oriented perpendicular to the plane of the formation in the direction of the sedimentary accretion. As previously mentioned, the formation resistivity when measured along this axis is often different than formation resistivity measured in the x-y plane. In a dipping bed, the x-axis may be chosen to be oriented in the direction of deepest ascent, i.e., "uphill".

In addition to the tool coordinate system and the formation coordinate system, a third coordinate system is employed herein. The borehole coordinate system has a z-axis that follows the central axis of the borehole. The x-axis of the borehole extends perpendicularly from the central axis through the high side of the borehole. (In a vertical borehole, the x-axis extends through the north side of the borehole.) The y-axis extends perpendicular to the other two axes in accordance with the right-hand rule.

Figure 6:
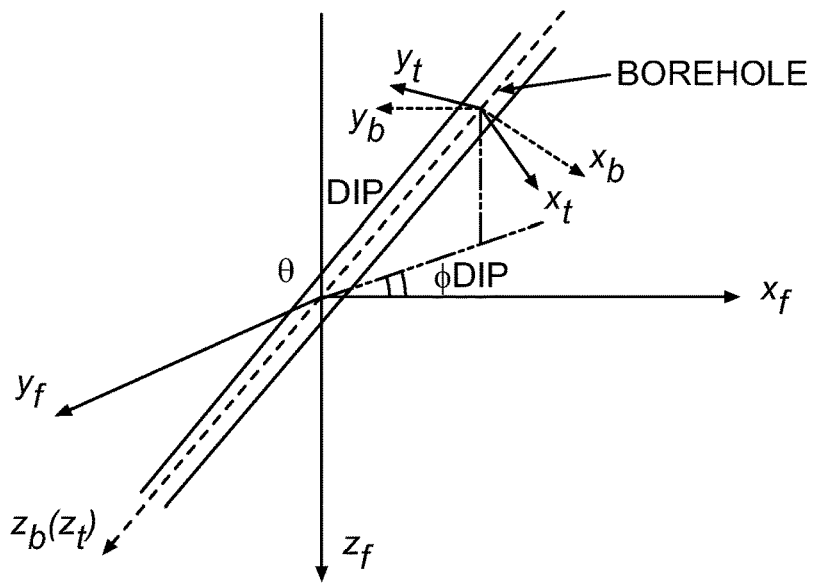
FIG. 6 shows a relationship between the coordinate systems of a tool, a borehole and a dipping formation bed in accordance with one or more embodiments of the present disclosure.

FIG. 6 illustrates how the three coordinate systems may be related. The formation coordinate system xf, yf, zf, is tied to the formation as explained previously, though due to symmetry the x- and y-axes can be shifted without affecting measurement of the formation parameters or properties. A borehole penetrates the formation or reservoir. The angle between the formation z-axis and the central axis of the borehole is called the dip angle. The azimuth φdip is the angle between the xf-axis and the projection of the borehole axis into the xf-yf plane. Because of the previously mentioned symmetry, the formation xf-axis can be arbitrarily positioned so that the dip azimuth φdip is zero (A side effect of this choice is that the borehole xb-axis becomes contained in xf-zf plane of the formation.)

Figure 7:
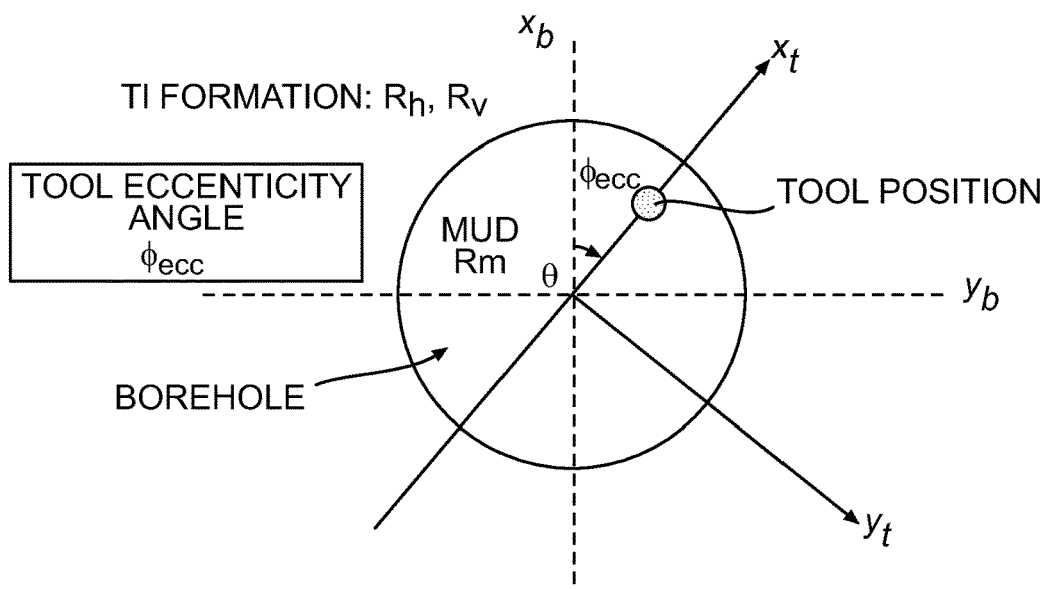
FIG. 7 shows a relationship between the coordinate systems of an eccentric tool and an elliptical borehole in accordance with one or more embodiments of the present disclosure.

The z-axis of the tool coordinate system coincides with the z-axis of the borehole coordinate system. As indicated in FIG. 7, the x-axis of the tool coordinate system is chosen to correspond to the direction of the tool's displacement from the central borehole axis. The angle between the borehole's xb-axis and the tool's xt-axis is denoted as the eccentricity azimuth φecc. The yt-axis of the tool coordinate system is of course perpendicular to the other two axes.

Treating FIGS. 4-7 as the basis of a model for predicting coupling component matrix measurements, the model parameters are horizontal resistivity of the formation Rh, vertical resistivity of the formation Rv, borehole diameter, borehole mud resistivity Rm, tool eccentricity displacement, tool eccentricity azimuth φecc, relative dip angle Dip, and relative dip azimuth φdip. When shoulder-bed boundary effects are ignored, the model assumes a circular borehole through an infinitely thick formation. Numerical simulations of the multi-component induction log response show that for a given array spacing and frequency, the foregoing parameters are sufficient. The coupling matrix components depend on the various parameters in different ways. For example, the zz-component is independent of the azimuthal angles φecc and φdip. This observation enables the parameter inversion process to be efficiently broken into relatively small, independent steps as illustrated in one or more of the following figures.

Figure 8:
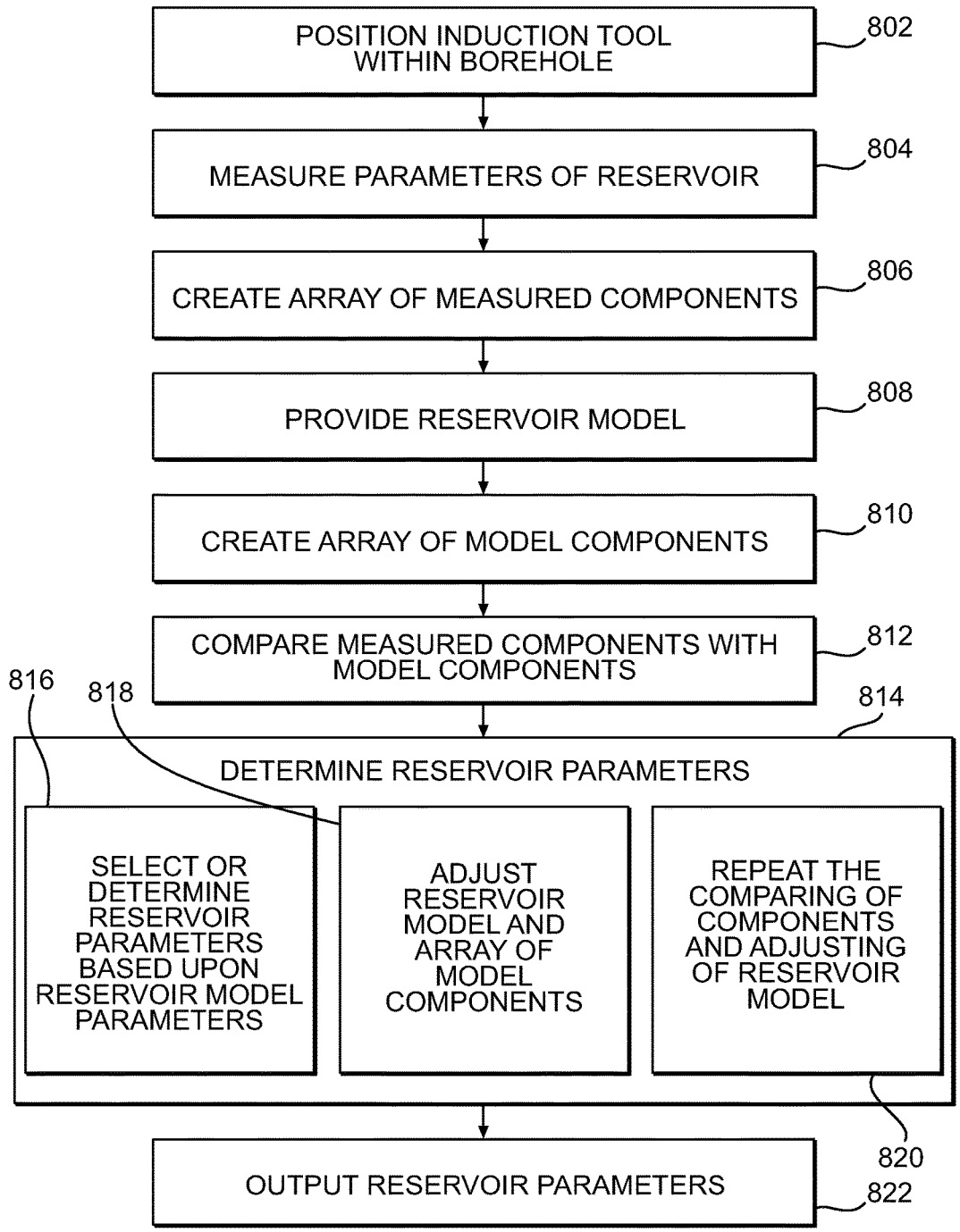
FIG. 8 is a flow diagram of an illustrative borehole effects minimization method in accordance with one or more embodiments of the present disclosure.

FIG. 8 is a flow diagram of an illustrative method or process to minimize the borehole effects when taking measurements with an induction tool. This may be used in a borehole or well including primarily water-based mud. The method includes positioning an induction tool, such as shown and discussed above, within a borehole of a well 802, and using the induction tool to take measurements of a reservoir 804. These measurements may be used to measure and determine the parameters of the reservoir. The measurements from the induction tool may be used to create an array of measurement components 806, such as a nine-component measurement discussed above.

The method further includes providing a reservoir model 808, such as one that has known parameters, and then creating or computing an array of model components 810 from the reservoir model with no borehole effects upon the model components. Alternatively, the model components may be provided, such as from a look-up table or chart, as opposed to creating or computing the model components using inversion techniques mentioned above.

Once both measured components and model components have been created or provided, the measured components and model components may be compared with each other 812. This may involve selecting and comparing only one or some of the measured components from the array of measured components with corresponding model components from the array of model components. For example, the xx-component from the measured components may be compared with the corresponding xx-component from the model components.

Further, a combination of measured components from the array of measured components may be compared with a corresponding combination of model components from the array of model components, such as by comparing corresponding linear combinations of components with each other. An example may include combining the xx-component and the yy-component (e.g., $A \cdot RXX + B \cdot RYY$) from the measured components, in which the components may be weighted with respect to each other using variables A and B as desired, and then comparing the result of this combination with a corresponding combination of the xx-component and the yy-component from the model components. Other examples may include combining the xx-component and the zz-component or the xz-component and the zx-component (e.g., $C \cdot RXX + D \cdot RYY$, $E \cdot RXZ + F \cdot RZX$) from the measured components, and comparing the result of this combination with a corresponding combination of the xx-component and the yy-component or the xz-component and the zx-component from the model components.

As the borehole effects may have a stronger influence over some components or combinations of components over others, the components and/or combinations of components with less or no influence by borehole effects may be compared with each other to facilitate determining the borehole effects and the parameters of the reservoir. The components and/or combinations of components with more influence by borehole effects may be ignored during this comparison portion.

The parameters for the reservoir may then be determined 814 based upon the comparison of the measured components with the model components. For example, if the measured components and/or combination of measured components and the corresponding model components and/or combination of model components are within a predetermined range of each other (e.g., within 10%, 1%, or 0.1% of each other), then one may select or determine that the parameters of the reservoir measured with the induction tool may be the same or similar as the parameters of the reservoir model 816.

If the measured components and/or combination of measured components and the corresponding model components and/or combination of model components are not within a predetermined range of each other, then the reservoir model and the array of model components may be adjusted 818. This may involve adjusting the known parameters of the reservoir model, along with the corresponding array of model components. For example, the horizontal formation resistivity (Rh), vertical formation resistivity (Rv), formation dip, and/or formation azimuth of the reservoir model may be adjusted, as appropriate, thereby adjusting the array of model components that would be provided, computed, or created from the reservoir model. This may further involve repeating the comparison of components and adjusting of the reservoir model and corresponding model components 820 until the measured components and/or combination of measured components and the corresponding adjusted model components and/or combination of adjusted model components are within a predetermined range of each other. At this point, once within the predetermined range of each other, one may determine that the parameters of the reservoir measured with the induction tool may be the same or similar as the parameters of the reservoir model. Once the parameters for the reservoir have been determined, the parameters may be output 822, such as by printing the parameters for the reservoir or displaying the parameters on a screen.

Figure 9:
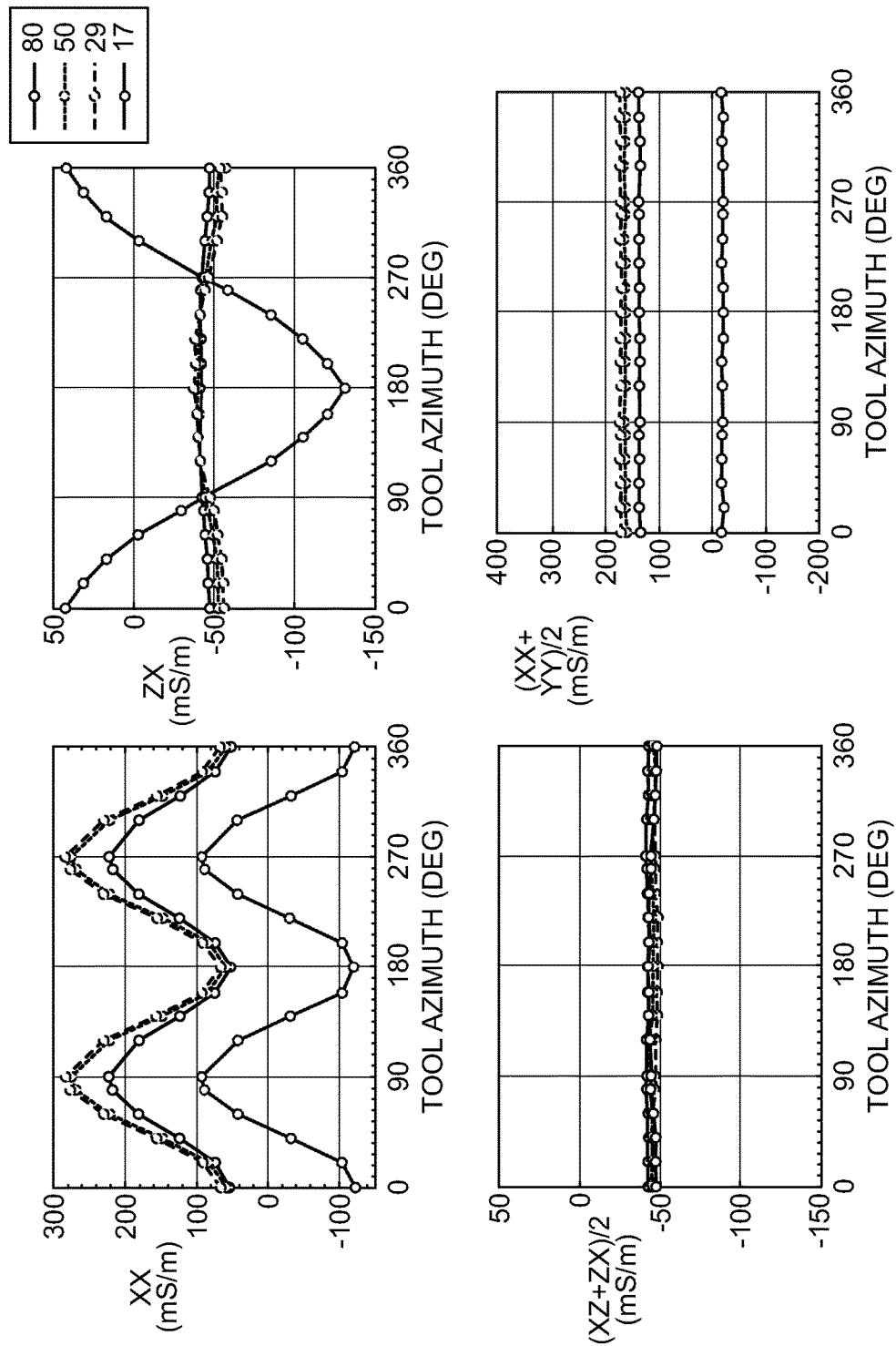
FIG. 9 shows charts demonstrating borehole effects for a tool rotated within a borehole in accordance with one or more embodiments of the present disclosure.

Referring now to FIG. 9, multiple charts of components and combinations of components measured by an induction tool with respect to the tool azimuth value or rotation in a borehole in accordance with one or more embodiments of the present disclosure are shown. Some of the parameters for these charts include a tool frequency of about 12 kHz, a mud resistivity, Rm, of about 0.1 ohm-meter, a borehole dip of about 50 degrees, a horizontal formation resistivity, Rh, of about 10 ohm-meter, a vertical formation resistivity, Rv, of about 5 ohm-meter, a tool eccentricity of about 0.5, a borehole azimuth of about 0 degrees, and a borehole size of about 8 inches. Further, each of the different lines within the charts correspond to a different receiver on the tool, in which the "80" line may have about an 80 inch spacing from the transmitter, and the "17" may have about an 17 inch spacing from the transmitter.

As shown in the top left chart in FIG. 9, the conductivity measurement for the xx-component measured by the receivers of the tool vary widely as the MOI rotates within the borehole. Similarly, as shown in the top right chart in FIG. 9, the conductivity measurement for the zx-component measured by the receivers of the tool vary widely as the tool rotates within the borehole, particularly for the 17 inch spacing receiver. These charts may demonstrate the borehole effect upon the measurements for the receivers of the tool, particularly with respect to certain components of the measurements.

The components, however, may be combined, such as in linear combinations, to help minimize or reduce the borehole effect. As shown in the bottom left chart in FIG. 9, the conductivity measurement for the xz-component and the zx-component measured by the tool measured by the receivers of the tool are combined (e.g., 0.5·CXZ·0.5·CZX) to produce a consistent result as the tools rotates within the borehole. Further, as shown in the bottom right chart in FIG. 9, the conductivity measurement for the xx-component and the yy-component measured by the tool measured by the receivers of the tool are combined (e.g., 0.5·CXX+0.5·CYY) to produce a consistent result as the tools rotates within the borehole. These charts demonstrate that measured components may be combined, such as linearly here, to produce results that have little to no borehole effects. These results and combinations (or even components that demonstrate little to no borehole effect) may be used to compare to corresponding components or combinations of components from a reservoir model with no borehole effects. When the components and/or combinations of components are within agreement of each otter or within a predetermined range of each other, then the parameters for the reservoir model may be selected as or used to determine the parameters for the reservoir measured by the tool.

To previously minimize borehole effects, a cost function minimization provided below was used in the inversion to iteratively solve a non-linear problem and recover formation Rh, Rv, and dip:

$$C(X) = \tfrac{1}{2} \Sigma (S_i - S_i^{(m)}(X))^2 \quad \text{Equation (1)}$$

In Equation (1), $S_i^{(m)}(X)$ is the modeled multi-component induction response corresponding to a solution vector X and $S_i$ is the measured data. In one or more embodiments of the present disclosure to minimize borehole effects, a modified cost function minimization provided below may be used in the inversion to iteratively solve a non-linear problem and recover formation $R_h$, $R_v$, and dip:

$$C'(X) = \tfrac{1}{2} \Sigma W_i \cdot \{S_i - S_i^{(m)}(X)\}^2 \quad \text{Equation (2)}$$

In Equation (2), $W_i$ are the weights for different combinations with the sum of the weights equal to one. The individual weights are a function of the borehole effects with the main purpose to reduce the contribution of the response of the components or combinations with larger borehole effects in the cost function. For example, in one inversion, the following components and/or combinations of $R_{ZZ}$, $2.5R_{ZZ}-R_{XX}$, and $(R_{ZZ}+R_{ZZ})/2$ may be used with the following weights: $W_1=0.5$ for $R_{ZZ}$, $W_2=0.3$ for $2.5R_{ZZ}-R_{XX}$, and $W_3=0.2$ for $(R_{ZZ}+R_{ZZ})/2$. This may result in reduced borehole effects in the final inverted $R_h$, $R_v$, and dip.

Figure 10:
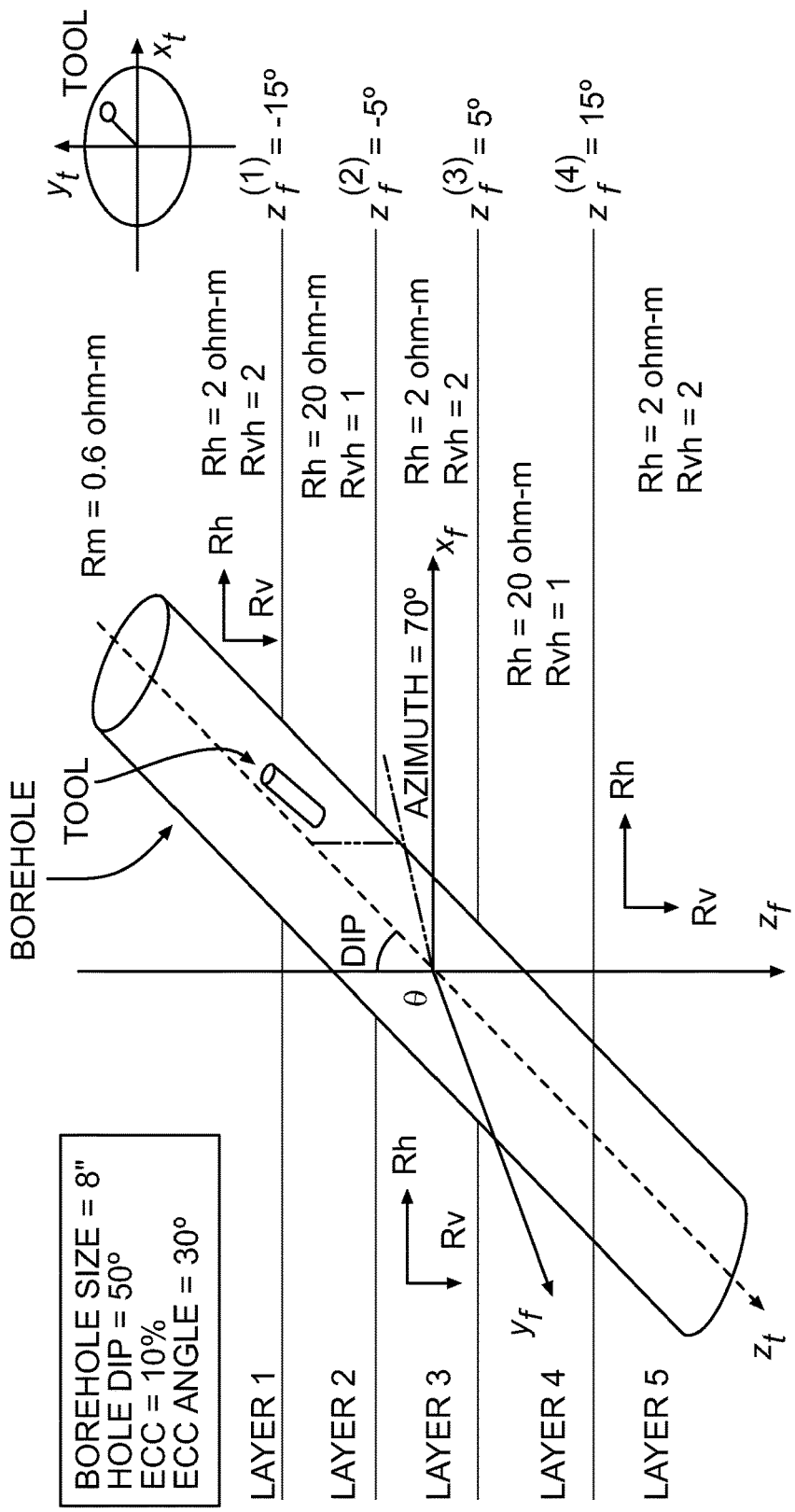
FIG. 10 shows an illustrative test geometry in accordance with one or more embodiments of the present disclosure.

FIG. 10 shows a formation model that may be used to verify one or more methods disclosed above. FIG. 10 shows a five-layer transversely-isotropic (TI) formation with a 50-degree deviated borehole (dip=50°) with a mud resistivity $R_m$ of about 0.6 ohm-meter (e.g., for water-based mud). The upper, middle, and lower formation layers each have horizontal formation resistivity $R_h$, of 2 ohm-meter and vertical formation resistivity $R_v$ of 4 ohm-meter. The middle upper layer and the middle lower layer each have horizontal formation resistivity $R_h$ of 20 ohm-meter and vertical formation resistivity $R_v$ of 20 ohm-meter. The middle upper layer, middle layer, and middle lower layer each have a thickness of 10 feet, and the borehole diameter is 8 inches. The simulated logging tool includes four triads receivers (transmitter-receiver separations of 17", 29", 50", and 80"), with other model parameters are shown in FIG. 10.

Figure 11:
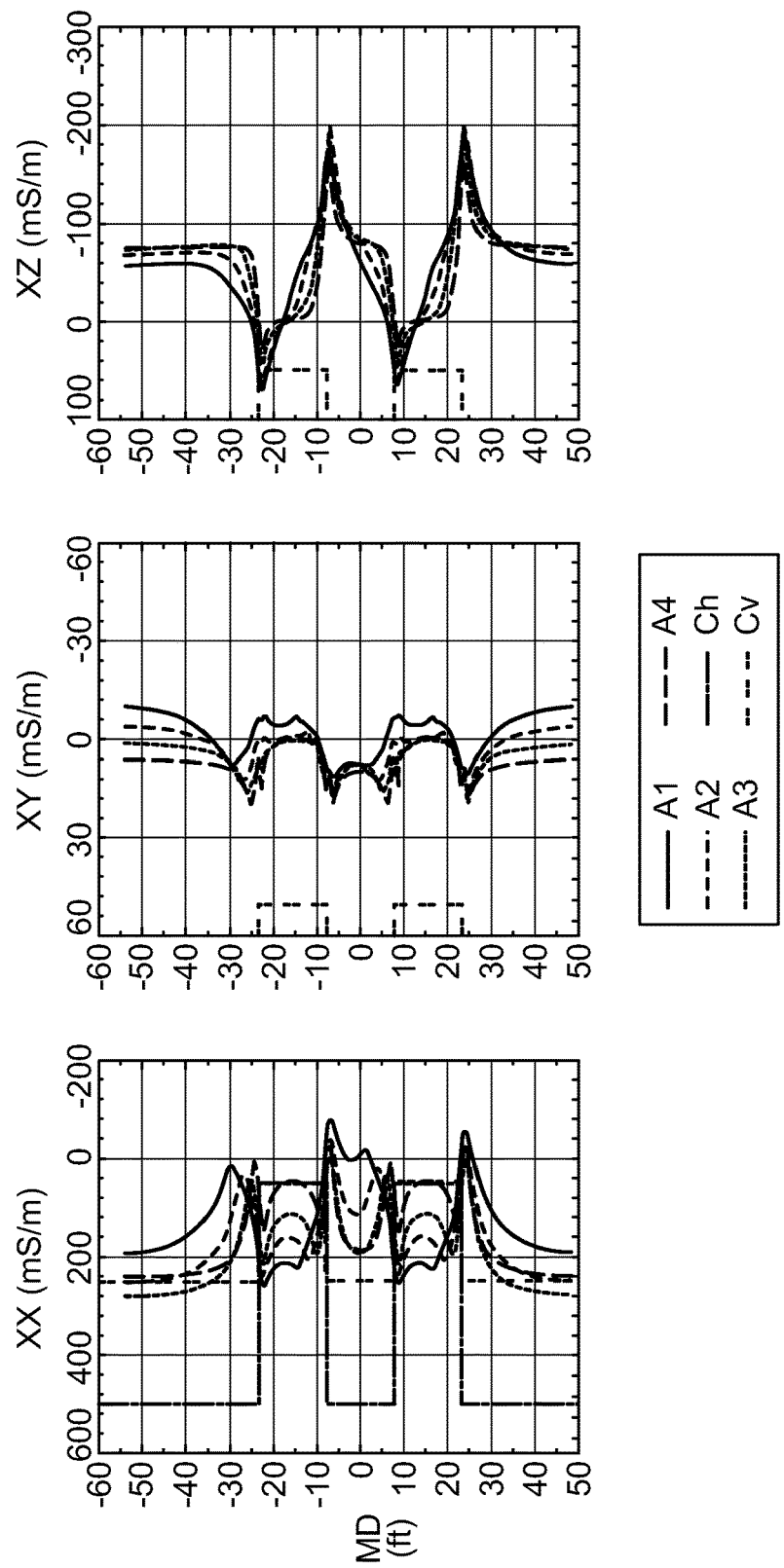
FIG. 11 shows illustrative borehole effects on logs using the model of FIG. 10 in accordance with one or more embodiments of the present disclosure.
Figure 12:
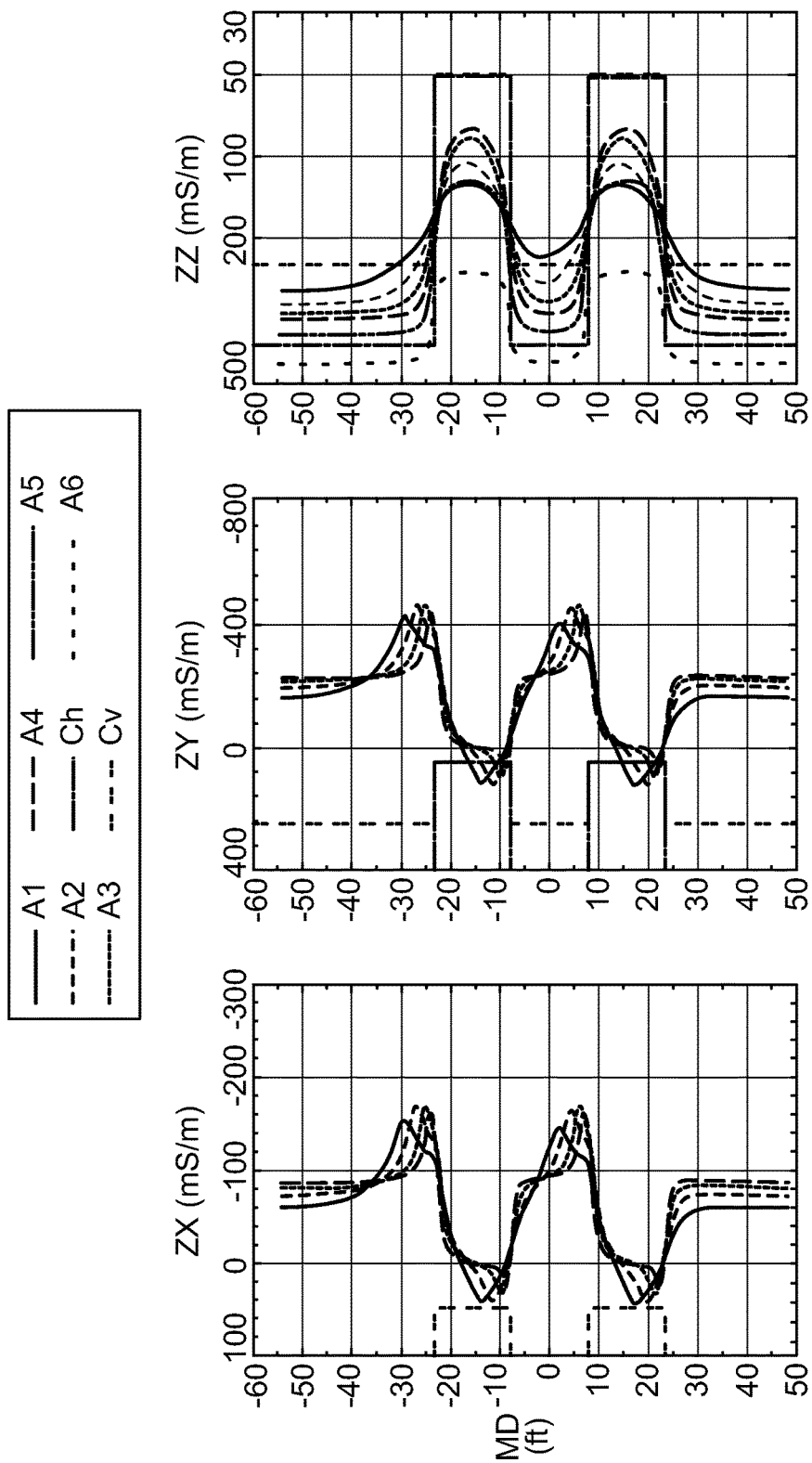
FIG. 12 shows illustrative borehole effects on logs using the model of FIG. 10 in accordance with one or more embodiments of the present disclosure.

FIGS. 11 and 12 show the measurement/simulated components from the tool for the model of FIG. 10. In particular, FIG. 11 shows the xx-component conductivity measurement logs for 4 triaxial arrays on the left, the xy-component conductivity measurement logs in the middle, and the xz-component conductivity measurement logs on the right, and FIG. 12 shows the zx-component conductivity measurement logs on the left, the zy-component conductivity measurement logs in the middle, and the zz-component conductivity measurement logs for six zz-arrays on the right.

Figure 13:
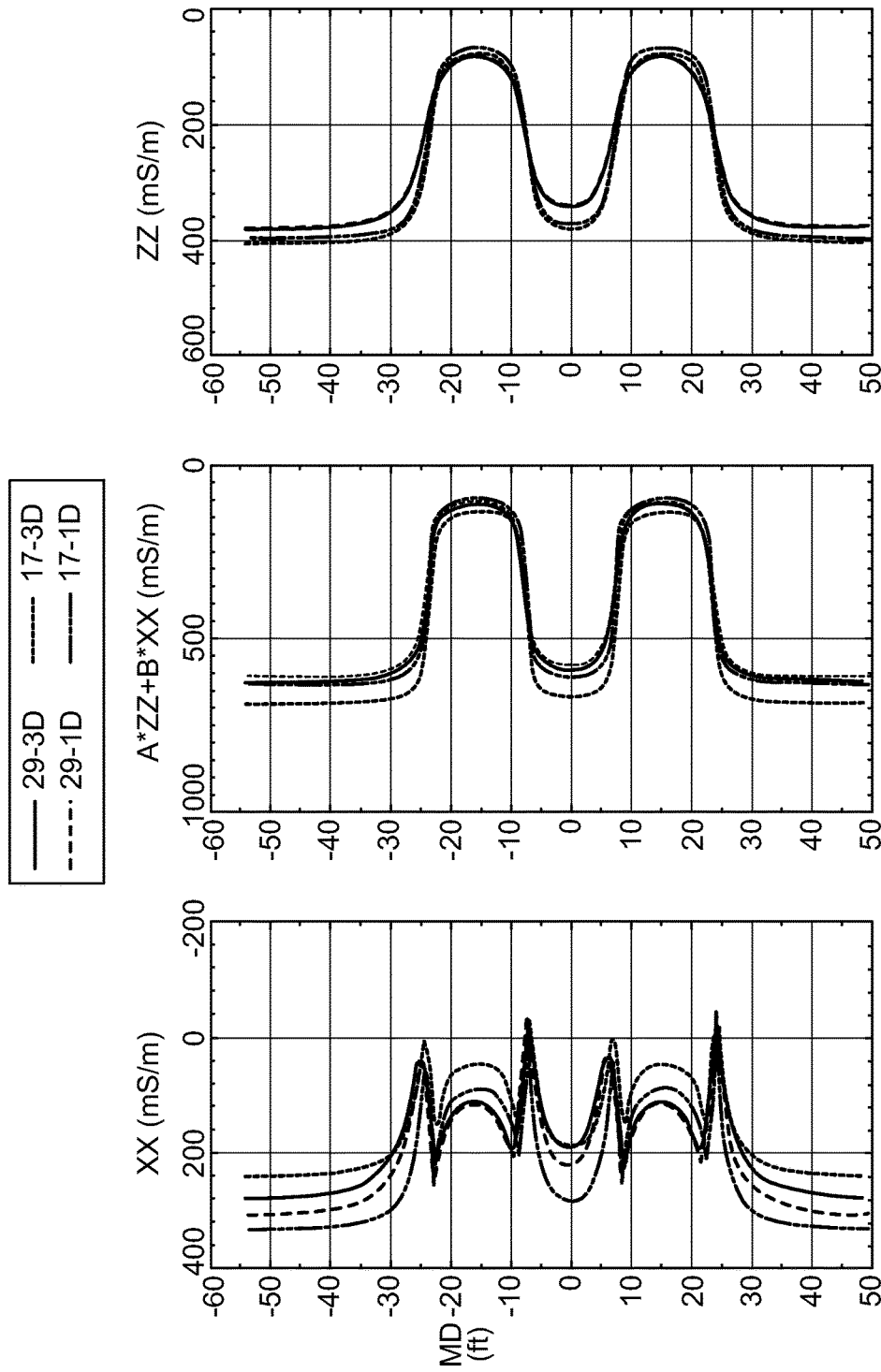
FIG. 13 shows illustrative borehole effects on logs using the model of FIG. 10 in accordance with one or more embodiments of the present disclosure.
Figure 14:
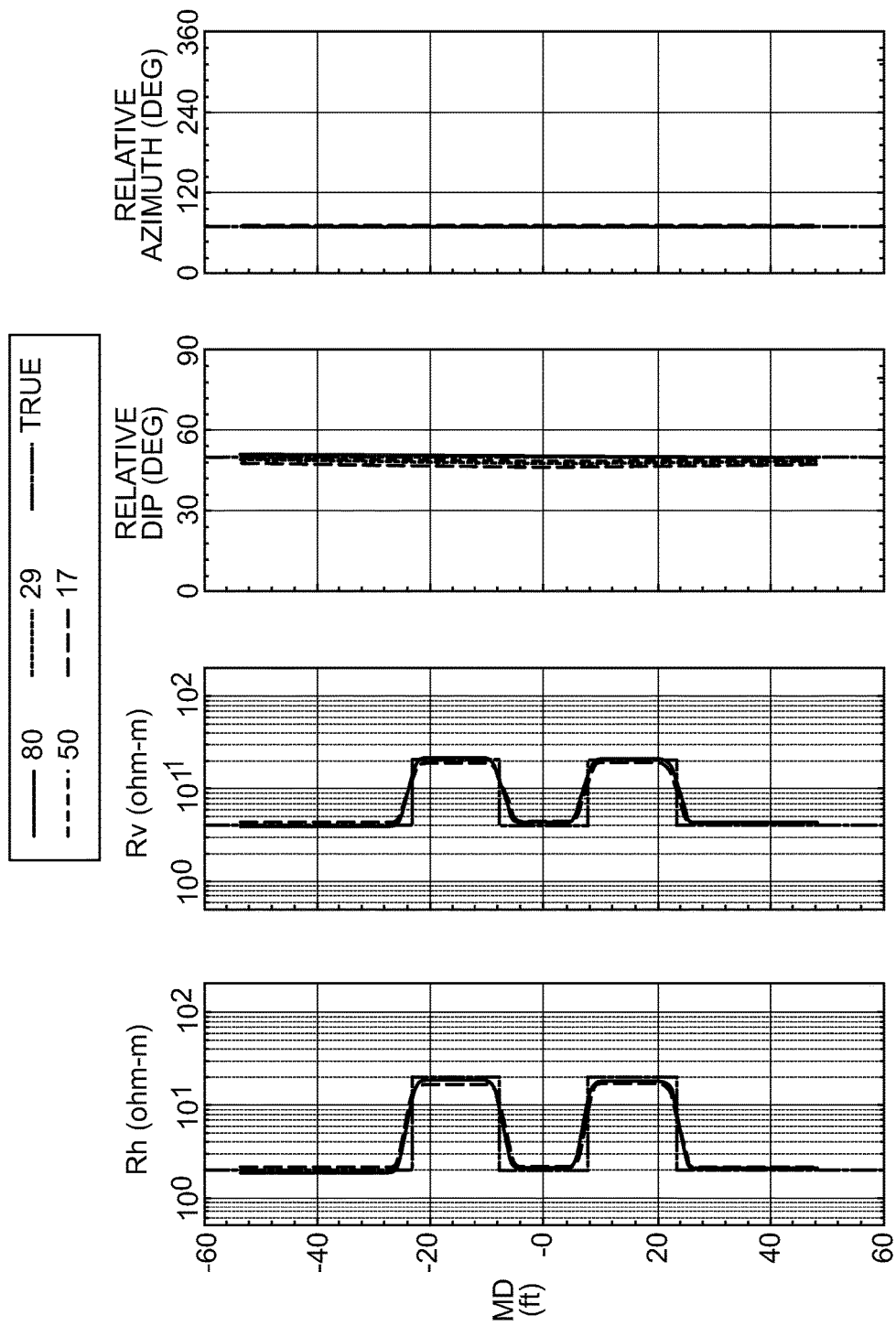
FIG. 14 shows illustrative the inverted formation parameters after borehole effects minimization using the model of FIG. 10 in accordance with one or more embodiments of the present disclosure.

FIG. 13 then shows a comparison of the measured results and components from the tool for the model of FIG. 10, both with and without a borehole. This may facilitate showing the borehole effect and the comparison with a minimization for the borehole effect in accordance with the present disclosure. FIG. 13 shows the xx-component conductivity measurement logs on the left, a combination of the zz-component and the xx-component (e.g., $A·C_{ZZ}+B·C_{XX}$) conductivity measurement logs in the middle, and the zz-component conductivity measurement logs on the right. By showing results with and without a borehole, the component combination (e.g., of the zz-component and the xx-component conductivity measurement logs) can be shown to reduce and minimize the borehole effects for more accurate reliability, particularly when compared to the xx-component conductivity measurement log. The measurements and data may then be inverted to recover formation parameters $R_h$, $R_v$, dip, and azimuth with each of the receivers. These results may be compared against the true formation $R_h$, $R_v$, dip, and azimuth, as shown in FIG. 14, showing strong agreement and verifying the borehole effects minimization reliability for methods disclosed herein.

Figure 15:
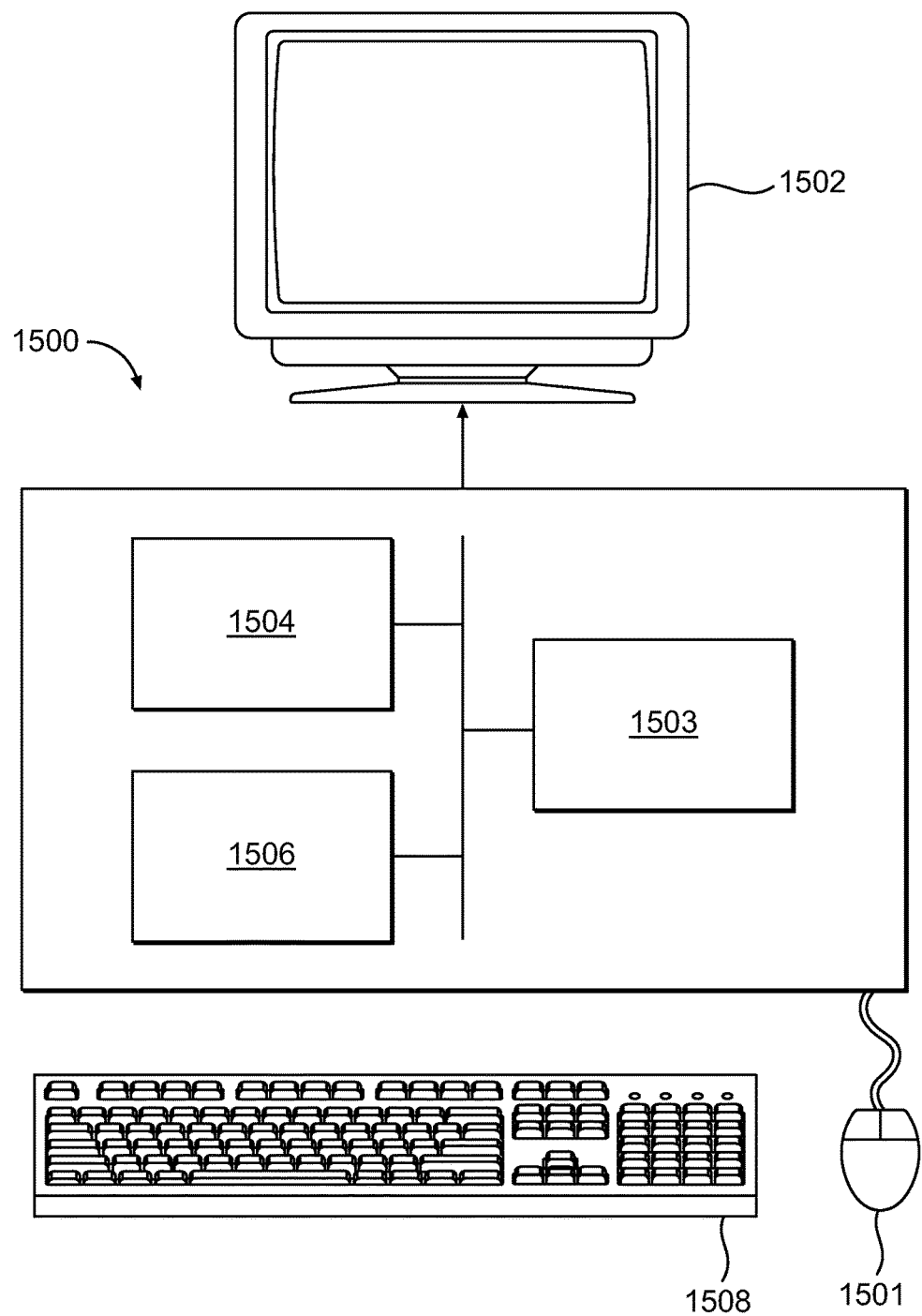
FIG. 15 illustrates a computer that may be used with one or more embodiments of the present disclosure.

Some embodiments of the present disclosure relate to systems for performing the above-described methods for minimizing borehole effects in induction tools in wells with water-based mud. A system in accordance with embodiments of the present disclosure may be implemented on a stand-alone computer or a downhole computer that is included on a logging tool. FIG. 15 shows a general purpose computer that may be used with embodiments of the invention.

As shown in FIG. 15, a general computer system may include a main unit 1500, a display 1502 and input devices such as a keyboard 1508 and a mouse 1501. The main unit 1500 may include a central processor unit 1504, a permanent memory (e.g., a hard disk) 1503, and a random access memory 1506. The memory 1503 may include a program that includes instructions for performing the methods of the invention. A program may be embodied on any computer retrievable medium, such as a hard disk, a diskette, a CD-ROM, or any other medium known or yet to be developed. The programming may be accomplished with any programming language and the instructions may be in a form of a source codes that may need compilation before the computer can execute the instructions or in a compiled (binary) or semi-compiled codes. The precise form and medium the program is on are not germane to the invention and should not limit the scope of the invention.

In addition to the embodiments described above, many examples of specific combinations are within the scope of the disclosure, some of which are detailed below:

Example 1

A method to minimize borehole effects upon a multi-component induction tool within a well and borehole comprising water-based mud, the method comprising:
measuring parameters of the reservoir with the induction tool to create an array of measured components;
comparing a measured component from the array of measured components with a corresponding model component from an array of model components for a reservoir model with known parameters and no borehole effects; and
determining the parameters for the reservoir based upon the comparison of the measured component and the corresponding model component.

Example 2

The method of Example 1, wherein the comparing comprises comparing a plurality of the measured components with a corresponding plurality of the model components.

Example 3

The method of Example 1, wherein the comparing comprises comparing only one or some of the measured components with a corresponding only one or some of the model components.

Example 4

The method of Example 1, further comprising:
computing the array of model components for the reservoir model with known parameters and no borehole effects.

Example 5

The method of Example 1, wherein the determining comprises:
determining the parameters for the reservoir based upon the known parameters from the reservoir model if the measured component and the corresponding model component are within a predetermined range of each other;
adjusting the array of model components from the reservoir model with different known parameters and no borehole effects if the measured component and the corresponding model component are not within the predetermined range of each other; and
repeating the comparing and the adjusting until the measured component and the corresponding adjusted model component are within the predetermined range of each other.

Example 6

The method of Example 5, wherein the determining further comprises:
selecting the known parameters from the reservoir model as the parameters for the reservoir if the measured component and the corresponding model component are within the predetermined range of each other.

Example 7

The method of Example 1, further comprising at least one of printing and displaying; on a screen the parameters for the reservoir.

Example 8

The method of Example 1, wherein the parameters of the reservoir comprise at least one of a horizontal formation resistivity, a vertical formation resistivity, a formation dip, and a formation azimuth.

Example 9

The method of Example 1, wherein a resistivity for the water-based mud is as low as about 0.1 ohm-meter.

Example 10

The method of Example 1, wherein the comparing comprises: comparing a combination of the measured components from the array of measured components with a corresponding combination of the model components from the array of model components.

Example 11

The method of Example 10, wherein the combination of the measured components and the corresponding combination of the model components comprise a linear combination.

Example 12

The method of Example 11, wherein the array of measured components and the array of the model components comprise a nine-component measurement, and wherein the linear combination comprises at least one of a xx-component and a yy-component combination, a xx-component and a zz-component combination, and a xz-component and a zx-component combination.

Example 13

A system to minimize borehole effects upon a multi-component induction tool within a well and borehole comprising water-based mud, the system comprising the induction tool, a processor, and a memory, wherein the memory stores a program comprising instructions for:
measuring parameters of a reservoir with the induction too to create an array of measured components;
comparing a measured component from the array of measured components with a corresponding model component from an array of model components for a reservoir model with known parameters and no borehole effects; and
determining the parameters for the reservoir based upon the comparison of the measured component and the corresponding model component.

Example 14

The system of Example 13, wherein the comparing comprises comparing only one or some of the measured components with a corresponding only one or some of the model components.

Example 15

The system of Example 13, wherein the determining comprises:
selecting the known parameters from the reservoir model as the parameters for the reservoir if the measured component and the corresponding model component are within the predetermined range of each other;
adjusting the array of model components from the reservoir model with different known parameters and no borehole effects if the measured component and the corresponding model component are not within the predetermined range of each other; and
repeating the comparing and the adjusting until the measured component and the corresponding adjusted model component are within the predetermined range of each other.

Example 16

The system of Example 13, wherein the parameters of the reservoir comprise at least one of a horizontal formation resistivity, a vertical formation resistivity, a formation dip, and a formation azimuth.

Example 17

The system of Example 13, wherein the comparing comprises:
comparing a combination of the measured components from the array of measured components with a corresponding combination of the model components from the array of model components.

Example 18

The system of Example 17, wherein the combination of the measured components and the corresponding combination of the model components comprise a linear combination.

Example 19

A method to minimize borehole effects upon a multi-component induction tool within a well and borehole comprising water-based mud, the method comprising:
measuring parameters of a reservoir with the induction tool to create an array of measured components;
determining an array of model components from a reservoir model with known parameters and no borehole effects;
comparing a combination of the measured components from the array of measured components with a corresponding combination of the model components from the array of model components;
determining the parameters for the reservoir based upon the comparison of the combination of the measured components and the corresponding combination of the model components; and
outputting the parameters for the reservoir.

Example 20

The method of Example 19, wherein the determining comprises:
selecting the known parameters from the reservoir model as the parameters for the reservoir if the combination of the measured components and the corresponding combination of the model components are within the predetermined range of each other;
adjusting the array of model components from the reservoir model with different known parameters and no borehole effects if the combination of the measured components and the corresponding combination of the model components are not within the predetermined range of each ether; and
repeating the comparing and the adjusting until the combination of the measured components and the corresponding combination of the adjusted model components are within the predetermined range of each other.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

We claim:
1. A method to minimize borehole effects upon a multi-component induction tool within a borehole comprising water-based mud, the method comprising:
measuring a reservoir with the multi-component induction tool to create an array of measured components;
minimizing borehole effects on a measured component from the array of measured components using a corresponding model component from an array of model components for a reservoir model with known parameters and no borehole effects;
comparing the minimized borehole effect measured component with the corresponding model component; and
if the minimized borehole effect measured component and the corresponding model component are within a predetermined range of each other, determining parameters for the reservoir based upon the known parameters from the reservoir model.

2. The method of claim 1, further comprising minimizing borehole effects on a plurality of measured components and wherein the comparing comprises comparing the plurality of the minimized borehole effect measured components with a corresponding plurality of the model components.

3. The method of claim 1, further comprising minimizing borehole effects on a plurality of measured components and wherein the comparing comprises comparing only one or some of the minimized borehole effect measured components with a corresponding only one or some of the model components.

4. The method of claim 1, further comprising computing the array of model components for the reservoir model with known parameters and no borehole effects.

5. The method of claim 1, wherein the determining comprises:
adjusting the array of model components from the reservoir model with different known parameters and no borehole effects if the minimized borehole effect measured component and the corresponding model component are not within the predetermined range of each other; and
repeating the comparing and the adjusting until the minimized borehole effect measured component and the corresponding adjusted model component are within the predetermined range of each other.

6. The method of claim 5, wherein the determining further comprises selecting the known parameters from the reservoir model as the parameters for the reservoir if the minimized borehole effect measured component and the corresponding model component are within the predetermined range of each other.

7. The method of claim 1, further comprising at least one of printing and displaying on a screen the parameters for the reservoir.

8. The method of claim 1, wherein the parameters of the reservoir comprise at least one of a horizontal formation resistivity, a vertical formation resistivity, a formation dip, and a formation azimuth.

9. The method of claim 1 wherein a resistivity for the water-based mud is as low as about 0.1 ohm-meter.

10. The method of claim 1, further comprising minimizing borehole effects on a plurality of measured components and wherein the comparing comprises comparing a combination of the minimized borehole effect measured components from the array of measured components with a corresponding combination of the model components from the array of model components.

11. The method of claim 10, wherein the combination of the minimized borehole effect measured components and the corresponding combination of the model components comprise a linear combination.

12. The method of claim 11, wherein the array of measured components and the array of the model components comprise a nine-component measurement, and wherein the linear combination comprises at least one of a xx-component and a yy-component combination, a xx-component and a zz-component combination, and a xz-component and a zx-component combination.

13. A system to minimize borehole effects upon a multi-component induction tool within a borehole through a reservoir comprising water-based mud, the system comprising the multi-component induction tool, a processor, and a memory, wherein the memory stores a program comprising instructions for:
measuring the reservoir with the multi-component induction tool to create an array of measured components;
minimizing borehole effects on a measured component from the array of measured components using a corresponding model component from an array of model components for a reservoir model with known parameters and no borehole effects;
comparing the minimized borehole effect measured component with the corresponding model component; and
if the minimized borehole effect measured component and the corresponding model component are within a predetermined range of each other, determining parameters for the reservoir based upon the known parameters from the reservoir model.

14. The system of claim 13, further comprising minimizing borehole effects on a plurality of measured components and wherein the comparing comprises comparing only one or some of the minimized borehole effect measured components with a corresponding only one or some of the model components.

15. The system of claim 13, wherein the determining comprises:
adjusting the array of model components from the reservoir model with different known parameters and no borehole effects if the minimized borehole effect measured component and the corresponding model component are not within the predetermined range of each other; and
repeating the comparing and the adjusting until the minimized borehole effect measured component and the corresponding adjusted model component are within the predetermined range of each other.

16. The system of claim 13, wherein the parameters of the reservoir comprise at least one of a horizontal formation resistivity, a vertical formation resistivity, a formation dip, and a formation azimuth.

17. The system of claim 13, further comprising minimizing borehole effects on a plurality of measured components and wherein the comparing comprises comparing a combination of the minimized borehole effect measured components from the array of measured components with a corresponding combination of the model components from the array of model components.

18. The system of claim 17, wherein the combination of the minimized borehole effect measured components and the corresponding combination of the model components comprise a linear combination.

19. A method to minimize borehole effects upon a multi-component induction tool within a well and borehole comprising water-based mud, the method comprising:
measuring a reservoir with the multi-component induction tool to create an array of measured components;
determining an array of model components from a reservoir model with known parameters and no borehole effects;
minimizing borehole effects on the measured components using corresponding model components from the array of model components;
comparing a combination of the minimized borehole effect measured components with the corresponding combination of the model components;
if the combination of the minimized borehole effect measured components and the corresponding combination of the model components are within a predetermined range of each other, determining parameters for the reservoir based upon the known parameters from the reservoir model; and
outputting the parameters for the reservoir.

20. The method of claim 19, wherein the determining comprises:
adjusting the array of model components from the reservoir model with different known parameters and no borehole effects if the combination of the minimized borehole effect measured components and the corresponding combination of the model components are not within the predetermined range of each other; and
repeating the comparing and the adjusting until the combination of the minimized borehole effect measured components and the corresponding combination of the adjusted model components are within the predetermined range of each other.

* * * * *